3,216,306
RETRACTABLE ROCK HOLE PIN
Glendon W. Taylor, 1047 Miner St.,
Idaho Springs, Colo.
Filed Feb. 23, 1962, Ser. No. 175,084
2 Claims. (Cl. 85—79)

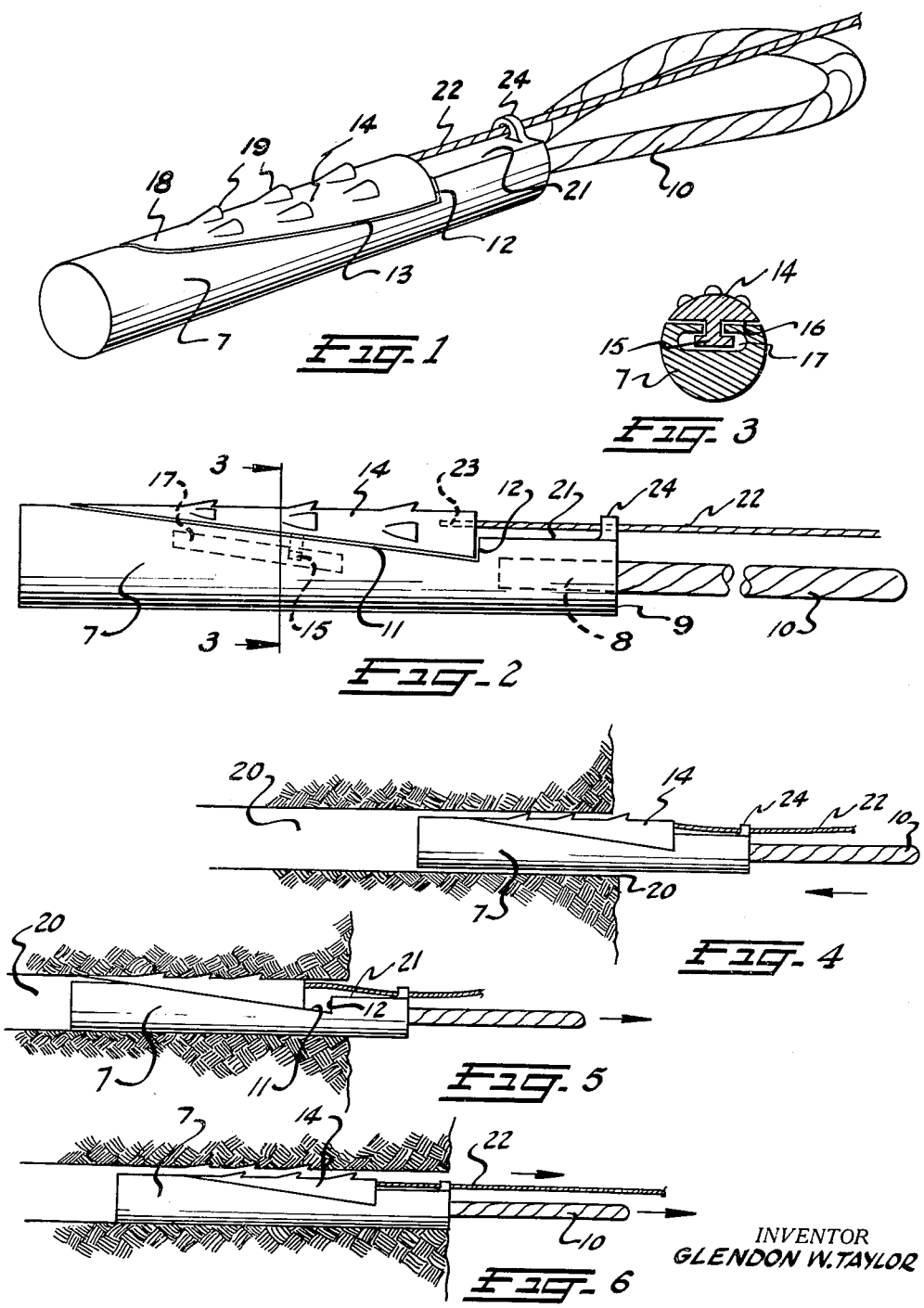

This invention relates generally to anchoring devices, and more specifically to certain new and useful improvements in the construction of a removable rock pin for use in securing equipment to rocks.

There is a distinct need in the mining industry for a more efficient anchoring pin for securing machinery whilst in operation. Presently known pins do not offer self wedging properties and may not be used effectively at all angular relationships with respect to the axis of the pin.

My invention provides distinct improvement over conventional pins by ensuring a positive wedging action at all times, the said pin having a retractable sliding wedge for cooperating within the rock hole, and having a wire loop extending from one end of the pin to provide anchorage from any desired direction.

It is therefore a primary object of this invention to provide a rock hole pin which may be simply inserted and selectively removed from a preformed hole in the rock to provide a rugged anchorage for any desired purpose.

It is a further object of this invention to provide a rock hole pin which incorporates a wedge shaped barb for sliding engagement relative to the pin, the said barb being retractable from operation by means of a release cord which extends from one end of the pin.

It is a still further object of this invention to provide a rock hole pin of the above class which is simple in construction, extremely efficient in operation, and may be manufactured in an economical manner.

A full understanding of the construction of this invention, together with further novel features and advantages, will be had from the following detailed description of a preferred embodiment thereof, taken in conjunction with the attached drawings wherein:

FIG. 1 is a perspective view of the rock hole pin which comprises my invention.

FIG. 2 is a side elevation of the pin.

FIG. 3 is a cross sectional end elevation taken along the line 3—3 of FIG. 2.

FIG. 4 is a side elevation of a rock face showing the pin being inserted into a hole drilled therein.

FIG. 5 is a cross sectional side elevation showing the pin wedged within the hole for operation.

FIG. 6 is a cross sectional side elevation showing how the pin is removed after use.

Similar reference characters indicate corresponding parts throughout the several views in the drawing.

Referring now to the drawings in detail, the numeral 7 represents a cylindrical pin which is drilled axially at 8 from the outer face 9 thereof to permanently receive and retain the ends of a steel wire loop 10. An inwardly extending cut 11 extends along a greater part of the pin and terminates with a diametric face 12 to form a wedge shaped cut-out generally indicated at 13. The removed portion 14 from the cut-out 13 forms a tapered barb or feather which slideably engages along the cut face 11 and is restricted in movement to an axial plane by a protruding T pin 15 which projects from the centre of the tapered face 16 of the barb and engages within a T shaped slot 17 formed centrally and inwardly of the cut face 11 formed in the pin 7. The tapered barb is thus removably attached to the pin 7 and is inserted into position by holding the barb 14 normally to the axial plane of the pin 7 such that the T pin 15 may be positioned within the T slot 17. The diametric face 12 thus becomes a front stop for the barb, and in such position forms a continuation of the cylindrical surface of the pin. The outer surface 18 of the barb is provided with a number of protrusions 19 which are adapted to bite into the rock surface and prevent slippage of the barb within the mounting hole 20.

Extending from the diametric face 12 to the outer end 9 of the pin, is a flattened portion 21 which provides clearance for a release cable 22 which is secured at one end at 23 within the tapered barb 14. The cable is threaded through a small eyelet 24 which projects from the flat portion 21 and is disposed adjacent the outer end 9 of the pin.

The operation of this device is believed obvious to those familiar with rock anchors. The pin with the tapered barb in the receded position is inserted into the mounting hole 20 as indicated in FIG. 4. After insertion, the loop 10 is withdrawn slightly thereby causing the tapered barb to slide rearwardly until the protrussions formed thereon tightly engage with the inner peripheral surface of the mounting hole as indicated in FIG. 5 of the drawings. When removing the pin, it must be first pushed inwardly as indicated in FIG. 6. Such movement will cause the barb to recede away from the peripheral surface of the hole and engage against the diametric face 12 formed in the pin. Withdrawal is then simply accomplished by holding the release cable and withdrawing the pin.

Having described the invention with considerable particularity, it should be understood that various modifications may be made to the precise detail, without departing from the scope or spirit of the invention, as defined by the following claims.

I claim:

1. A retractable rock hole pin comprising a cylindrical pin, a wedge-shaped cut-out formed longitudinally and intermediate the ends of the pin and having an inclined bottom surface, a tapered barb having a complementary inclined surface and slidably located in said cut-out, anchorage means secured to one end of the pin, a release cable secured to one end of the barb for selectively retracting same into said cut-out, said inclined bottom surface of said cut-out having a slot being T-shaped in transverse cross-section formed longitudinally therein, said T-shaped slot terminating short of the axis of the ends of the wedge-shaped cut-out, and a T pin protruding from said tapered barb for removable and sliding engagement within said slot, said pin having a T-shaped cross-section with the cross portion of the T being generally transverse to the longitudinal axis of the barb, said cross-section having a transverse dimension less than the corresponding part of the slot, the longitudinal thickness of the T pin being slightly less than the width of the narrowest part of the T-shaped slot thereby permitting insertion of the T pin in the T-shaped slot when the longitudinal axis of the tapered barb is disposed transverse to the longitudinal axis of the cylindrical pin and permitting turning of the barb to its normal position along the wedge-shaped cut-out.

2. A retractable rock hole pin comprising a generally cylindrical member having ends and a wedge-shaped cut-out formed in a portion of the surface thereof, said cut-out being disposed longitudinally and intermediate the ends of said member and having a surface inclined with respect to the longitudinal axis of said member, said inclined surface having a slot being T-shaped in transverse cross-section formed longitudinally therein, said T-shaped slot terminating short of the axis of the ends of the wedge-shaped cut-out, a tapered barb having a complementary inclined surface and slidably located in said cut-out, said barb having a T pin protruding outwardly from said inclined surface for removable and sliding engagement within said slot, said pin having a T-shaped cross-section with the cross portion of the T being generally transverse to the longitudinal axis of the barb, said T-shaped cross-section having a transverse dimension less than the corresponding parts of the slot, the longitudinal thickness of the T pin being slightly less than the width of the narrowest part of the T-shaped slot thereby permitting insertion of the T pin in the T-shaped slot when the longitudinal axis of the tapered barb is disposed transverse to the longitudinal axis of the cylindrical member and permitting turning of the barb to its normal position along the wedge-shaped cut-out, anchorage means secured to one end of the cylindrical member and a release cable secured to one end of the barb for selectively retracting the same into said cut-out.

References Cited by the Examiner

UNITED STATES PATENTS

| | | |
|---|---|---|
| 1,259,640 | 3/18 | Leake. |
| 1,396,398 | 11/21 | Bowman. |
| 1,727,296 | 9/29 | Matte. |
| 1,820,667 | 8/31 | Leves. |
| 2,774,273 | 12/56 | Olson. |
| 2,878,668 | 3/59 | Starling et al. |
| 2,896,494 | 7/59 | Lerick. |
| 3,021,745 | 2/62 | Libom. |

FOREIGN PATENTS 49,720    11/89    Germany.

EDWARD C. ALLEN, *Primary Examiner.*

CARL W. TOMLIN, *Examiner.*